No. 784,401. PATENTED MAR. 7, 1905.
C. P. HUDSON.
ICE CREAM FREEZER.
APPLICATION FILED APR. 15, 1904.
3 SHEETS—SHEET 1.
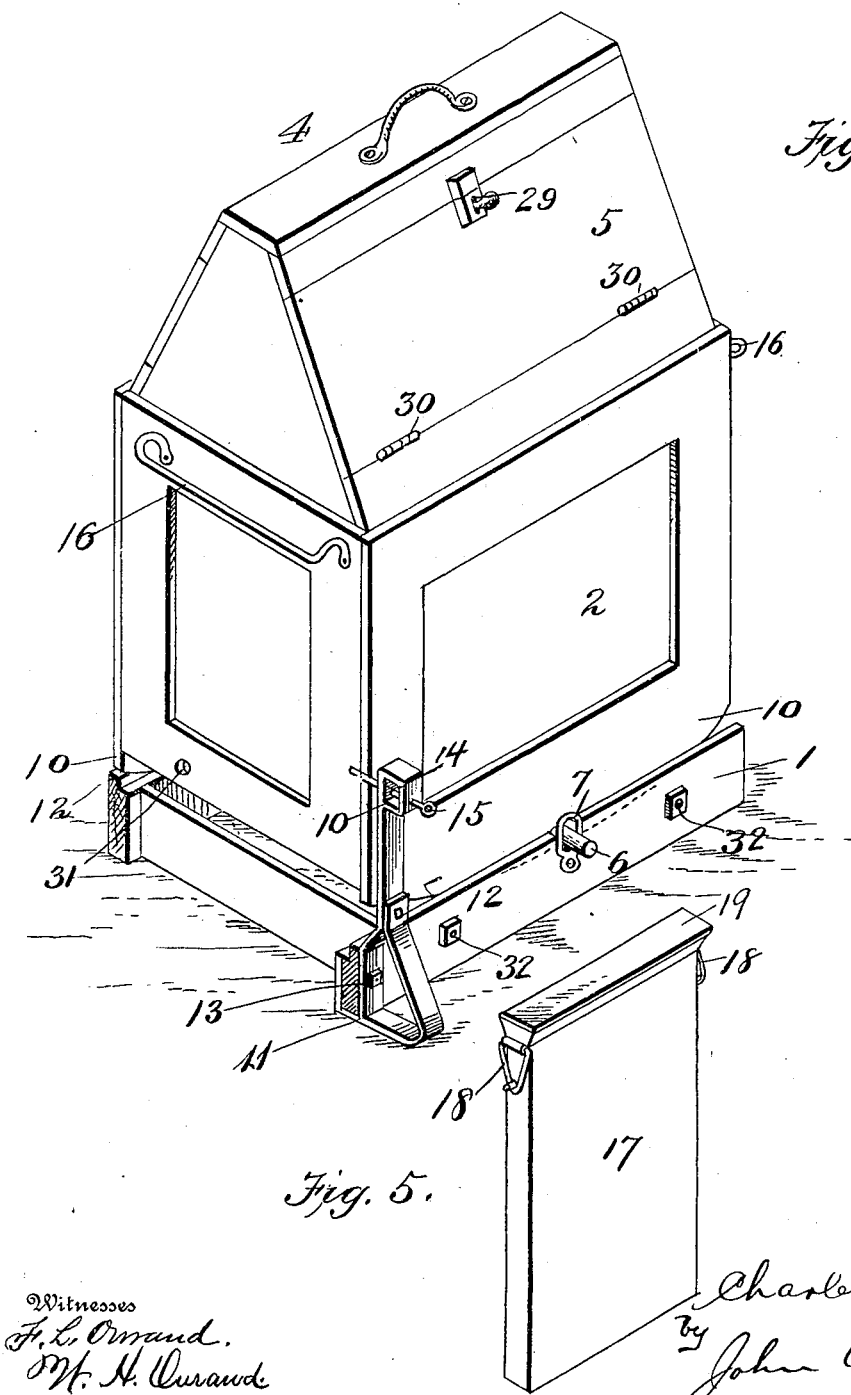

No. 784,401. PATENTED MAR. 7, 1905.
C. P. HUDSON.
ICE CREAM FREEZER.
APPLICATION FILED APR. 15, 1904.
3 SHEETS—SHEET 2.
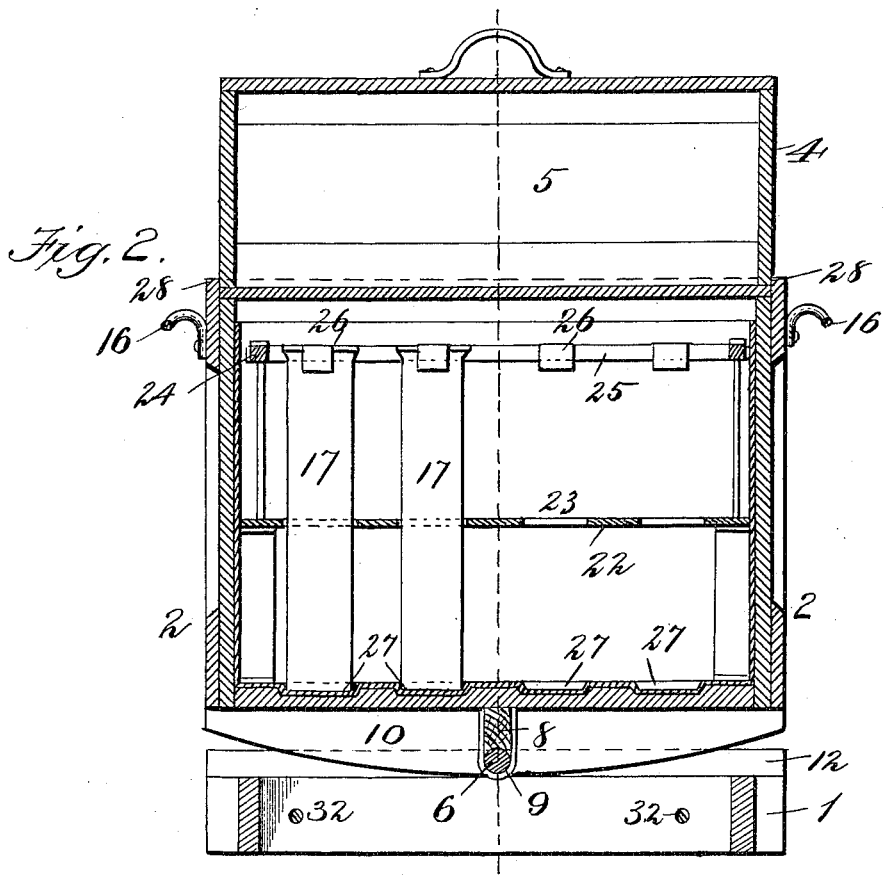
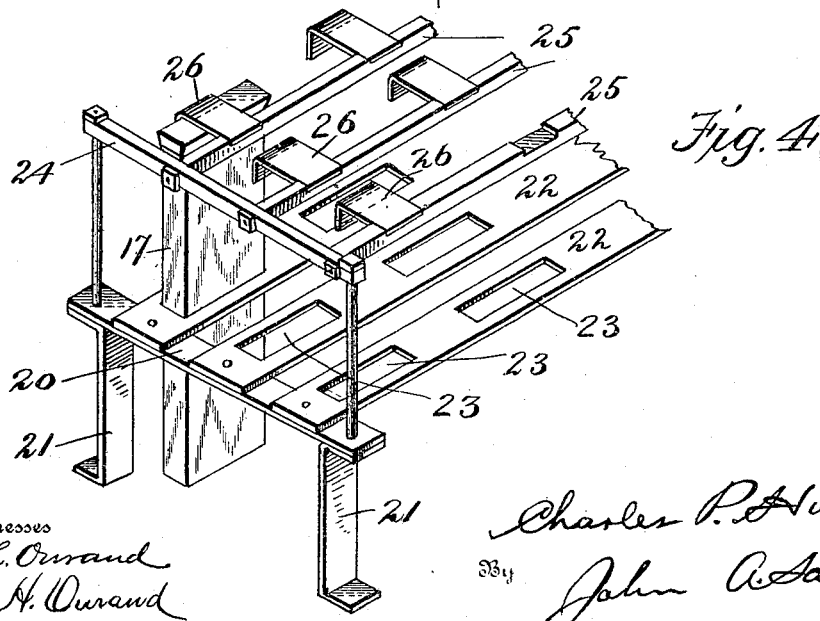
Witnesses
F. L. Ourand
W. H. Ourand
Inventor
Charles P. Hudson,
By John A. Saul.
Attorney

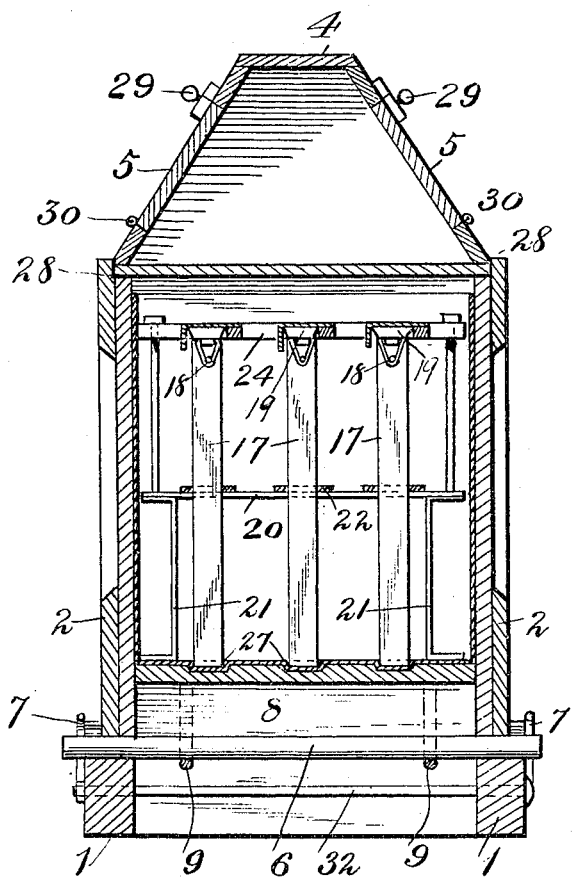

No. 784,401.

Patented March 7, 1905.

UNITED STATES PATENT OFFICE.

CHARLES P. HUDSON, OF LANCASTER, SOUTH CAROLINA.

ICE-CREAM FREEZER.

SPECIFICATION forming part of Letters Patent No. 784,401, dated March 7, 1905.

Application filed April 15, 1904. Serial No. 203,373.

*To all whom it may concern:*

Be it known that I, CHARLES P. HUDSON, a citizen of the United States, residing at Lancaster, in the county of Lancaster and State of South Carolina, have invented certain new and useful Improvements in Ice-Cream Freezers, of which the following is a specification.

My invention relates to ice-cream freezers, and more particularly to ice-cream freezers for freezing the cream in blocks; and it has for its object to so construct the same that ice-cream may be frozen in receptacles, and said receptacles may be singly or collectively withdrawn from the freezer and the contents thereof placed in a suitable receptacle.

In the drawings forming a part of this specification, and in which like symbols of reference represent corresponding parts in the several views, Figure 1 is a perspective view of the complete device; Fig. 2, a longitudinal section of the same; Fig. 3, a transverse section; Fig. 4, a sectional view of the interior frame for holding the ice-cream receptacles, and Fig. 5 a view of the ice-cream receptacle.

1 represents the base or supporting part of the freezer, 2 the body of the same, and 4 the top thereof.

5 represents the doors of the device.

6 is a journal upon which the device is held to the base 1 and is supported and oscillates.

7 represents bearings on the side of the base in which the journal rests, 8 a beam connected to the bottom of the device upon which the journal 6 rests and is connected by staples 9, and 10 rockers upon which the device is adapted to be rocked. The rockers are held in place by upwardly-extending side pieces 12.

11 is a detachable foot adapted to be connected to the base 1 by bolt 13 and has perforations 14 for reception of a pin 15, the object of the same being to lock the device rigid when desired.

16 represents handles for operating the device.

17 represents the receptacles for the ice-cream, the same having clasps 18 to hold the tops 19 in place. The receptacles 17 are adapted to be received and supported within a frame 20, composed of feet 21, longitudinal rods 22, having perforations 23 for reception of said receptacles, and transverse rods 24, in which are journaled rods 25. The rods 25 have angular clamps 26, the same being adapted to be turned upon and clamp the receptacles 17 in place and release the same by simply rotating the rods 25, thus elevating the clamps 26.

The base and sides of the main receptacle 2 are lined with zinc or the like and has depressions or recesses 27 on its bottom to receive and steady the receptacles 17. The main frame 20 may be lifted bodily out of the freezer with the receptacles 17, carried by the same, or the receptactles 17 may be lifted out separately, if desired. The top 4 rests within side pieces 28 of the device, and said top can be readily lifted from the same.

29 represents latches to hold the doors 5, and 30 represents hinges for said doors.

31 is a perforation to drain the device, and 32 represents bars to brace the device together.

The device is generally operated by hand, and it will be apparent that a crank or other means may be attached to it and any desired power applied.

The operation of the device will be apparent from the foregoing. The ice and salt are first packed in between the frame 20 and the device agitated. After the freezing the receptacles and contents are removed, as described.

Having now fully described my invention, what I claim as new, and desire to secure by Letters Patent, is—

1. In an ice-cream freezer, the combination with the freezer proper, of a frame within the same, consisting of longitudinal rods having perforations along their length, and longitudinal rods carrying clamps, transverse rods, said clamp-rods journaled in the transverse rods, and ice-cream receptacles adapted to be received within the perforations in the longitudinal rods and held by the clamp-rods.

2. In an ice-cream freezer, a base, a top provided with rockers adapted to operate on the base, and a detachable foot adapted to be connected with the base, and carrying a bolt, said bolt adapted to lock the receptacle when desired.

3. In an ice-cream freezer, the combination with the freezer proper, of a frame within the same, feet supporting said frame, longitudinal rods having perforations along their length, longitudinal rods carrying clamps, transverse rods, said clamp-rods journaled in the transverse rods, ice-cream receptacles, and recesses in the bottom of the freezer to receive the receptacles.

In testimony whereof I affix my signature in presence of two witnesses.

CHARLES P. HUDSON.

Witnesses:
   JNO. A. COOK,
   H. HINES.